UNITED STATES PATENT OFFICE 2,664,425

SUBSTITUTED MONOTHIOSEMICARBA-ZONES OF DIFORMYLBENZENES

Hans Schmidt, Wuppertal-Vohwinkel, and Robert Behnisch and Fritz Mietzsch, Wuppertal-Elberfeld, Germany, assignors to Schenley Industries, Inc., New York, N. Y.

No Drawing. Application February 6, 1952,
Serial No. 270,268

6 Claims. (Cl. 260—310)

This invention relates to condensation products of thiosemicarbazones derived from phthalaldehyde and its isomers, which are found to be possessed of good antibacterial activity, especially against tubercle bacilli.

It has been found that the reaction of, at choice, one of the isomeric phthalaldehydes, with thiosemicarbazide can be conducted so that either monothiosemicarbazones or dithiosemicarbazones are principally formed. For instance, if one of the three isomeric phthalaldehydes is reacted with thiosemicarbazide in the molar ratio of 1:2, the corresponding phthalalmonothiosemicarbazone is principally obtained. Formation of the dithiosemicarbazone under these conditions, to a large extent, may be prevented by gradually adding the thiosemicarbazide solution to the phthalaldehyde and by avoiding prolonged heating of the reaction mixture.

The formyl-benzalthiosemicarbazones obtainable in this manner may be further reacted with amino compounds in accordance with this invention to yield improved chemotherapeutical agents. For instance, therapeutically valuable products of this type can be obtained by using amino compounds which have solubilizing groups in the molecule, or by using amino compounds that have, as such, a therapeutical potency, for instance, aminosalicylic acid, 4-amino-benzalthiosemicarbazone, aminoantipyrine (1:5-dimethyl-2-phenyl-4-amino-3-pyrazolone), 4-amino-benzenesulfonamide, 4 - amino - benzenesulfoguanidine, 4-amino-benzenesulfonamido-pyridine, 4-amino-benzenesulfothiourea, 2-(p - amino - benzenesulfonamido) - 4 - methyl - pyrimidine, allyl amine and p-amino-acetanilide.

The invention is further illustrated by the following examples without being restricted thereto.

Example 1

About 27 grams of terephthalaldehyde in 750 ccs. of alcohol are refluxed and a hot solution of 18 grams of thiosemicarbazide in 250 ccs. of water is added thereto in small portions. Towards the end of this addition, precipitation starts. Prolonged heating is avoided to minimize formation of the dithiosemicarbazone by rearrangement. The hot solution is filtered from the insoluble material, which is the dithiosemicarbazone formed as by-product, and on cooling, yellow, bright crystals precipitate from the filtrate in an abundant quantity. These crystals can be recrystallized from dilute alcohol or from butanol and are soluble in caustic soda to produce a yellow colored solution. The melting point of the product is about 215° C., with decomposition, and it is the monothiosemicarbazone of terephthalaldehyde, represented by the formula:

$$O=CH-\langle\phantom{xx}\rangle-CH=N.NHCSNH_2$$

Alternatively, this intermediate product may be obtained by proceeding as follows:

A solution of 54 g. of thiosemicarbazide in 360 cc. of water and 120 cc. of 5 N. hydrochloric acid is added, while stirring, slowly over a period of several hours to a solution of 80.4 g. of terephthalaldehyde in 1000 cc. of methanol. After a short period of time, if necessary after inoculation with a seed crystal, the terephthalal-monothiosemicarbazone begins to crystallize. When crystallization is finally completed, the precipitate is filtered off and washed with water. The monothiosemicarbazone of terephthalaldehyde is obtained in good yield. By this procedure, merely very little of the undesired terephthalaldithiosemicarbazone is found in the product as an impurity and the monothiosemicarbazone may be easily separated from it by recrystallizing from dilute aqueous ethanol.

About 20.7 grams of terephthalaldehydemonothiosemicarbazone, prepared as above described, and 19 grams of 4-amino-benzalthiosemicarbazone, obtainable by condensing 4-aminobenzaldehyde with thiosemicarbazide in an aqueous medium (melting point 204°), are refluxed in two liters of methyl alcohol. The reactant compounds remain partially dissolved temporarily, but the yellow-colored condensation product soon begins to precipitate before complete clarification of the solution occurs. Boiling of the mixture is continued for some time, and, if desired, a few drops of glacial acetic acid may be added to accelerate the reaction. After cooling the reaction mixture, the reaction product is precipitated and it is removed by filtration and washed with methyl alcohol and acetone. About 35 grams of a yellow powder are obtained which, when heated, decomposes above 260° C. This product is insoluble or difficultly soluble, in the ordinary solvents and it may be represented by the following formula:

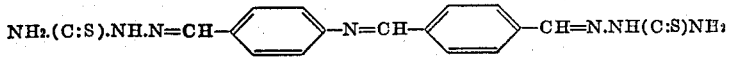

Similarly the compound

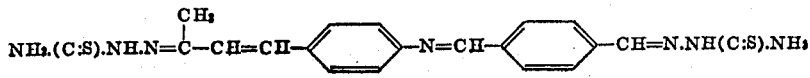

may be obtained as an orange-yellow powder, melting at 257° C. The 4-aminobenzal acetone thiosemicarbazone is obtainable according to our copending application Serial No. 217,414, filed March 24, 1951.

Example 2

By reacting terephthalaldehyde-monothiosemicarbazone, prepared as described in Example 1, with a substantially equimolecular quantity of p-amino-salicylic acid, the compound represented by the formula:

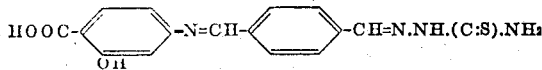

can be obtained. This product has a melting point above 340° C. and is soluble in aqueous alkali solutions.

Example 3

About 27 grams of isophthalaldehyde are dissolved in 750 ccs. of hot alcohol, and a hot solution of 18 grams of thiosemicarbazide in 250 ccs. of water containing a few drops of glacial acetic acid is added slowly thereto. After a few minutes following the addition, an almost colorless precipitate begins to form, the undesired dithiosemicarbazone of isophthalaldehyde, which is removed by filtering the hot solution, and upon cooling the filtrate, the monothiosemicarbazone of isophthalaldehyde can be obtained by proceeding in a manner similar to that described in Example 1.

This product can be condensed with 4-aminobenzalthiosemicarbazone in a manner similar to terephthalaldehyde monothiosemicarbazone as described in Example 1, or it may likewise be condensed with p-amino-salicylic acid as described in Example 2, yielding, respectively, the compounds represented by the formulae:

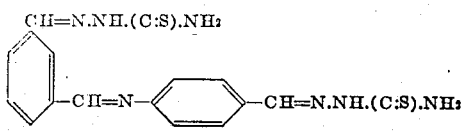

and

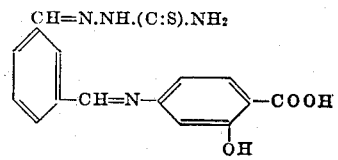

Example 4

The operations described in Example 1 are repeated with phthalaldehyde (o-bis-formyl-benzene) substituted for the terephthalaldehyde there employed and the intermediate product, o-formyl-benzalthiosemicarbazone, may be then condensed with amino compounds to produce the desired final products. For instance, when this intermediate product is condensed with 4-aminobenzalthiosemicarbazone, the product obtained is that represented by the formula:

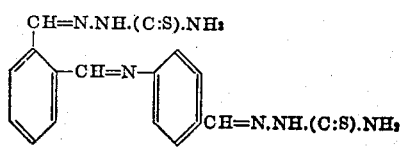

and when it is condensed with p-amino-salicylic acid, the product obtained is that represented by the formula:

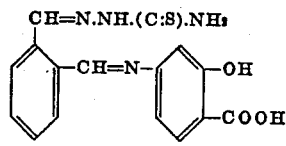

Example 5

About 20.7 grams of terephthalaldehyde-monothiosemicarbazone and 20.3 grams of aminoantipyrin (1:5-dimethyl-2-phenyl-4-amino-3-pyrazolone) in 800 cc. of methanol, to which a few drops of glacial acetic acid have been added, are refluxed for several hours, while stirring, then the reaction mixture is cooled, and the reaction product precipitated is recovered by filtration. About 40 grams of this product, a yellow powder having a melting point of 251° C., are obtained. It is represented by the formula:

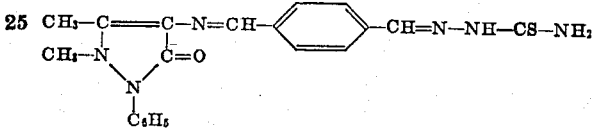

Example 6

About 31 grams of terephthalal-monothiosemicarbazone and 25.8 grams of 4-amino-benzenesulfonamide in 1200 cc. of methonal, to which a few drops of glacial acetic acid have been added, are refluxed for 24 hours while stirring, whereupon the reaction mixture is cooled. The product precipitated is recovered as in the preceding examples and obtained in a very good yield, as a yellow powder, sintering at about 250° C. It has the formula:

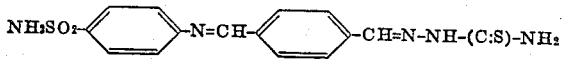

Example 7

In a manner analogous to that described in Example 6, terephthalal-monothiosemicarbazone and 4-amino-benzenesulfonylguanidine may be condensed to yield a yellow condensation product, having a melting point of 238° C., represented by the formula:

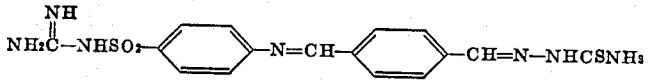

Condensation products of terephthalal-monothiosemicarbazone with 4-amino-benzenesulfonylthiourea (melting point 218° C.), 4-amino-benzenesulfonamido-pyridine (melting point 224° C.), and 2-(p-amino-benzenesulfonamido)-4-methyl pyrimidine (melting point 245° C.) may be prepared in the same manner. The melting points of these products are not sharp and the products begin to decompose at the temperatures indicated.

Example 8

About 41.4 grams of terephthalal-monothiosemicarbazone and 12.4 grams of allyl amine are refluxed, with stirring, for 24 hours in 700 cc. of methanol, with addition of a few drops of glacial acetic acid, and the reaction product is recovered as in the preceding examples. It is obtained as a light yellow powder, melting at 175° C., and having the formula:

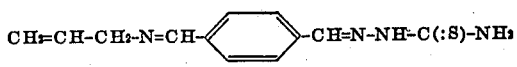

In the same manner, terephthalal-monothiosemicarbazone and p-amino-acetoanilide yield a yellow condensation product having a melting point of 239° C. (with decomposition) and being represented by the formula:

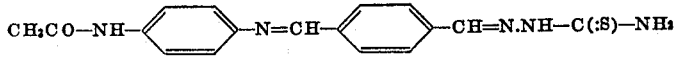

The corresponding condensation products of amino-compounds with phthalaldehyde-monothiosemicarbazone and with isophthalaldehyde monothiosemicarbazone may be prepared in the same manner, as indicated in Examples 3 through 8.

This application is a continuation-in-part of co-pending application Serial No. 128,023, filed November 17, 1949, by the same inventors and entitled "Thiosemicarbazones," now U. S. Patent 2,600,077 issued June 10, 1952.

In certain of the following claims, the compounds of this invention are defined by generalized structural formulae, for example, by the formula:

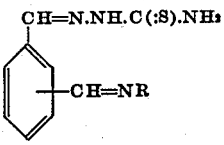

wherein R is the amino compound residue. It will be understood that in this definition of the invented compounds, R means all of the amino compound molecule excepting the amino group itself. It is, therefore, the radical of one of the above disclosed amine reactants which may be defined as being selected from the group consisting of 3-hydroxy-4-carboxyphenyl, 4-(thiosemicarbazonomethylidene)phenyl, antipyrinyl, 4-sulfamylphenyl, 4-(guanyliminosulfonyl)phenyl, 4-(2'-pyridyliminosulfonyl)phenyl, 4-(thioureidosulfonyl)phenyl, 4-(4'-methylpyrimidyl-2'-iminosulfonyl)phenyl, allyl and 4-acetamidophenyl. The indefinite article a is used before the term formyl-benzalthiosemicarbazone in order that the three position isomers of the compound may be defined thereby.

Having thus described the subject matter of this invention, what it is desired to secure by Letters Patent is:

We claim:

1. A condensation product of p-formyl-benzalthiosemicarbazone and a primary amino compound chosen from the group consisting of aminosalicylic acid, 4-aminobenzalthiosemicarbazone, aminoantipyrine, 4-aminobenzenesulfonamide, 4-aminobenzenesulfoguanidine, 4-aminobenzenesulfonamido-pyridine, 4-aminobenzenesulfothiourea, 2-(p-aminobenzenesulfonamido)-4-methylpyrimidine, allyl amine and p-aminoacetanilide; that is represented by the formula:

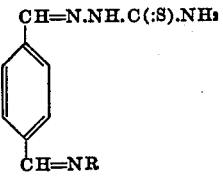

wherein R is a radical selected from the group consisting of 3-hydroxy-4-carboxyphenyl, 4-(thiosemicarbazonomethylidine)phenyl, antipyrinyl, 4-sulfamylphenyl, 4-(guanyliminosulfonyl)phenyl, 4-(2'-pyridyliminosulfonyl)phenyl, 4-(thioureidosulfonyl)phenyl, 4-(4'-methylpyrimidyl-2'-iminosulfonyl)-phenyl, allyl and 4-acetamidophenyl.

2. A compound represented by the formula:

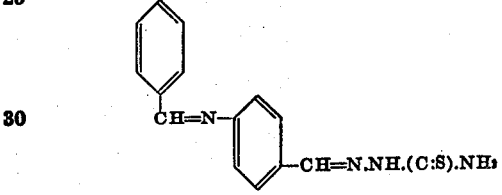

3. A compound represented by the formula:

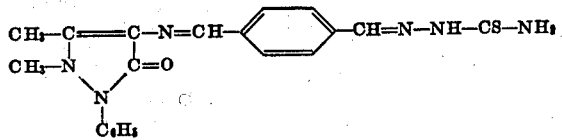

4. A compound represented by the formula:

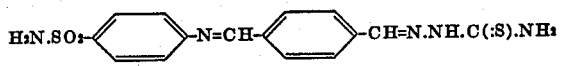

5. A compound represented by the formula:

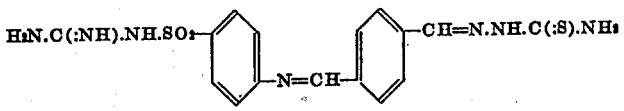

6. A compound represented by the formula:

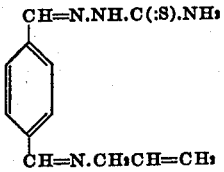

HANS SCHMIDT.
ROBERT BEHNISCH.
FRITZ MIETZSCH.

References Cited in the file of this patent

Behnisch et al., "Angewandte Chemie," vol. 60, May 1948, pp. 113–5.